Feb. 19, 1924. 1,484,113
M. C. CRAWLEY
TYPEWRITING MACHINE
Filed Sept. 30, 1922 7 Sheets-Sheet 1
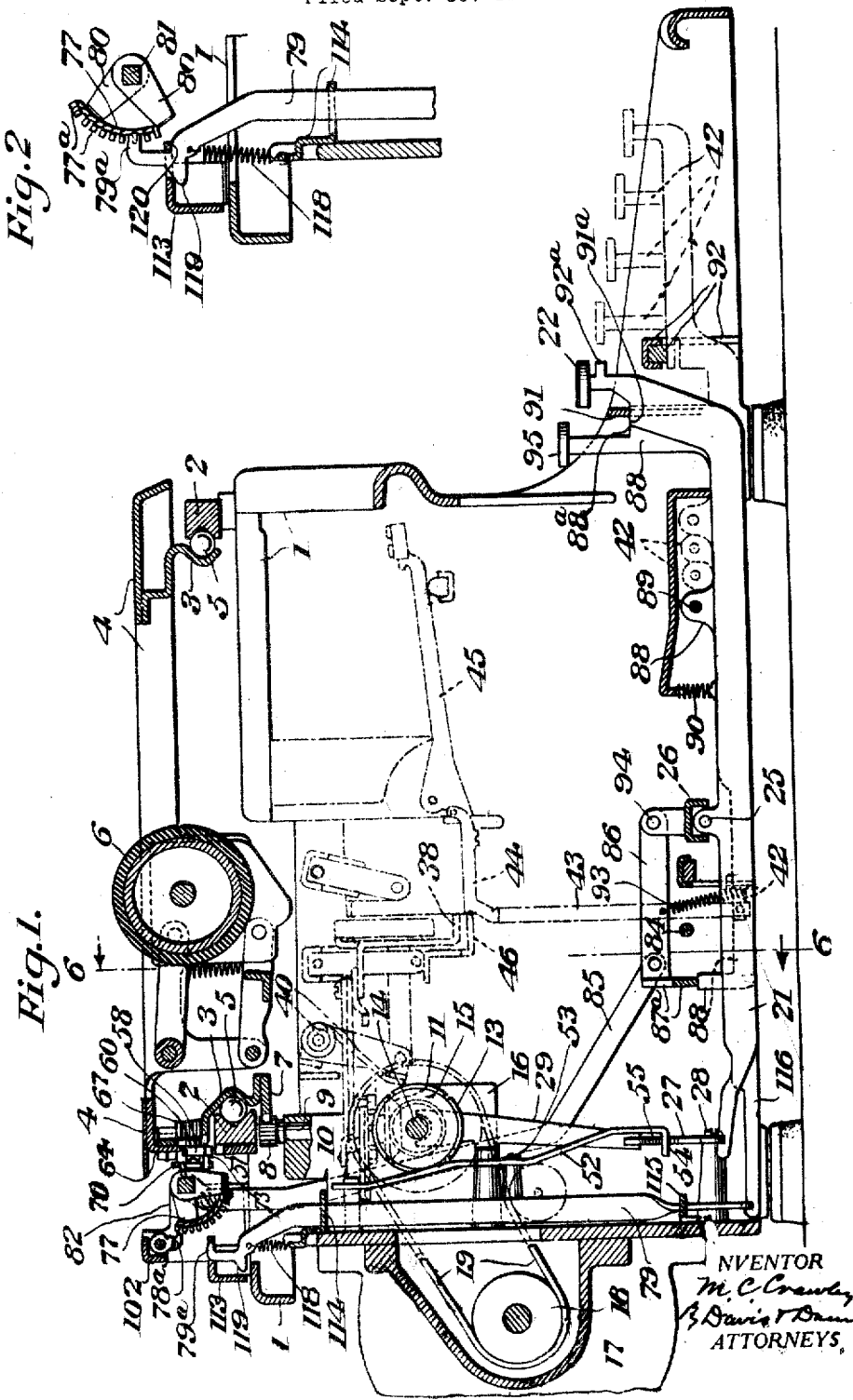

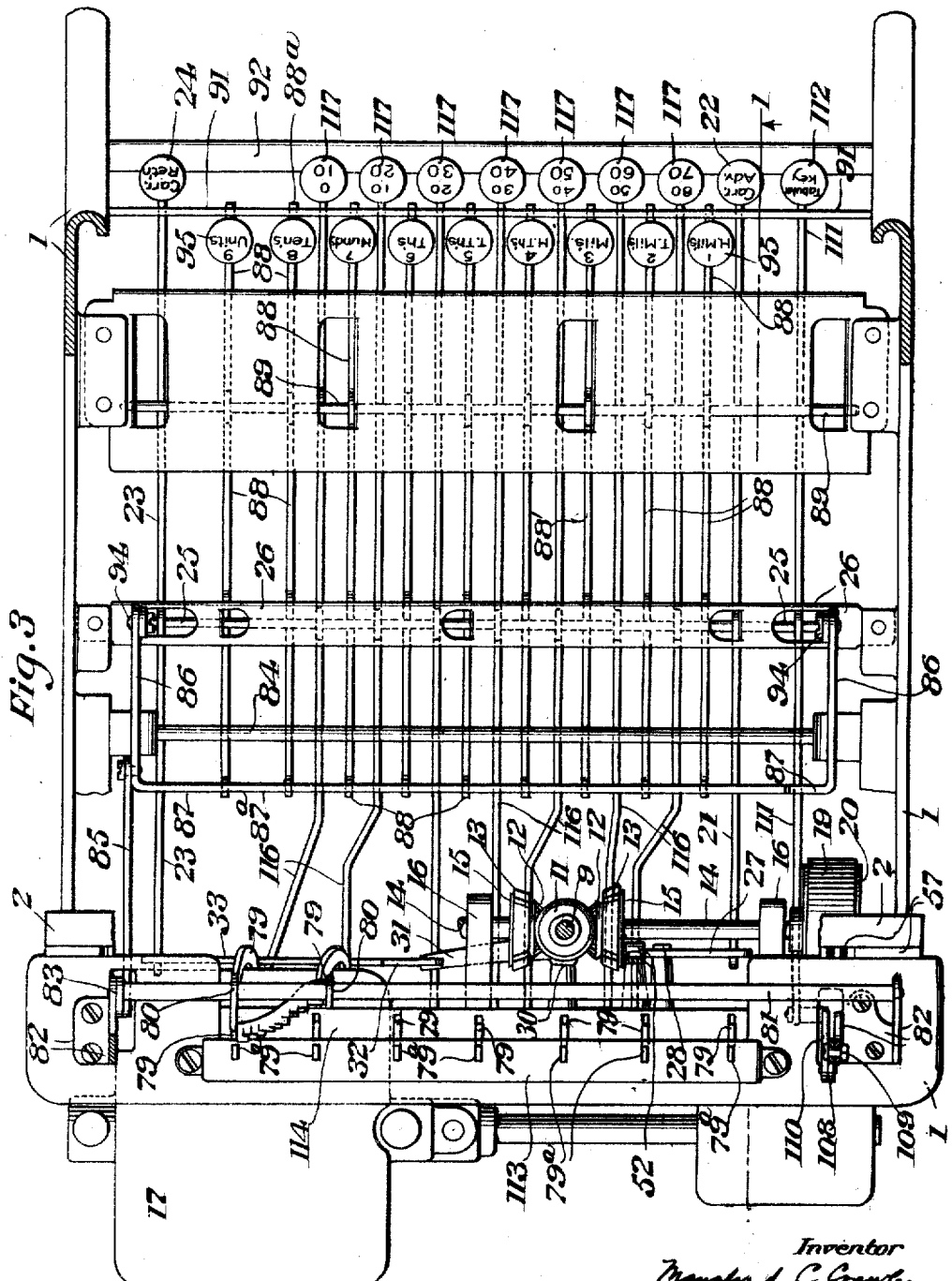

Feb. 19, 1924.
M. C. CRAWLEY
TYPEWRITING MACHINE
Filed Sept. 30, 1922
1,484,113
7 Sheets-Sheet 3
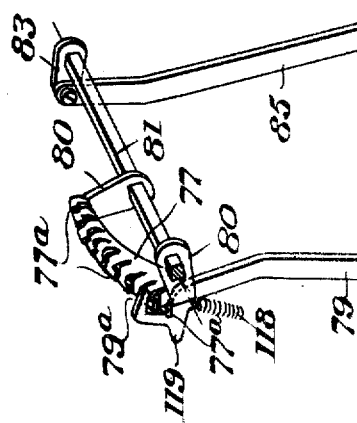
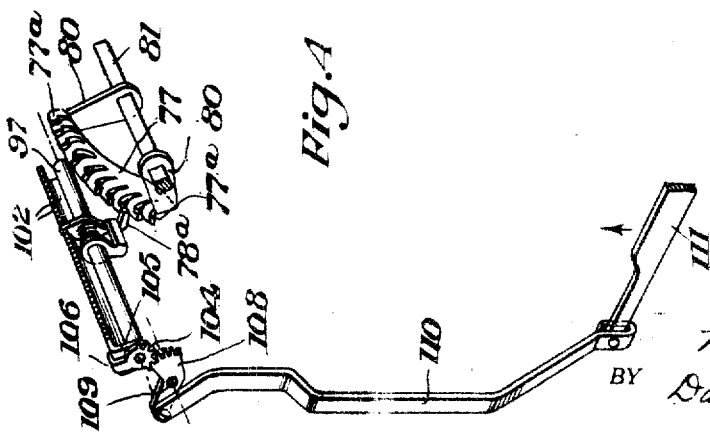
INVENTOR
Manfred C. Crawley
BY Davis & Davis
ATTORNEYS

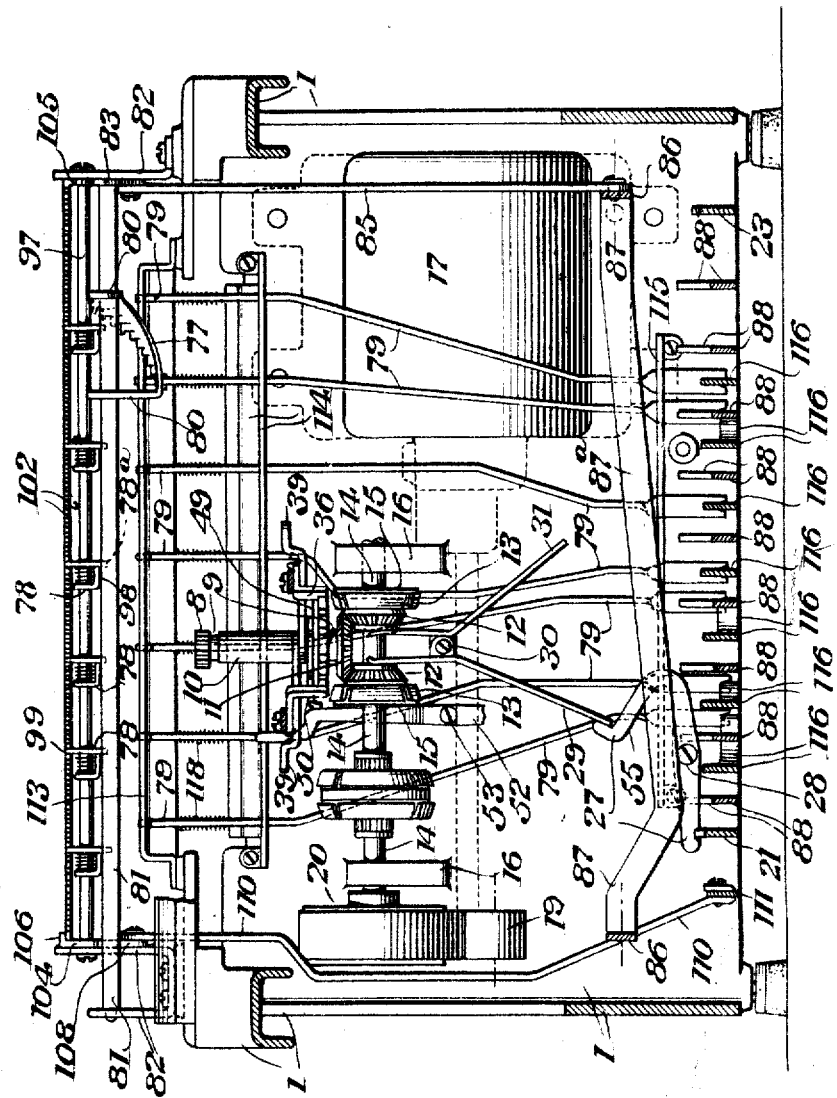

Feb. 19, 1924. 1,484,113
M. C. CRAWLEY
TYPEWRITING MACHINE
Filed Sept. 30, 1922 7 Sheets-Sheet 5
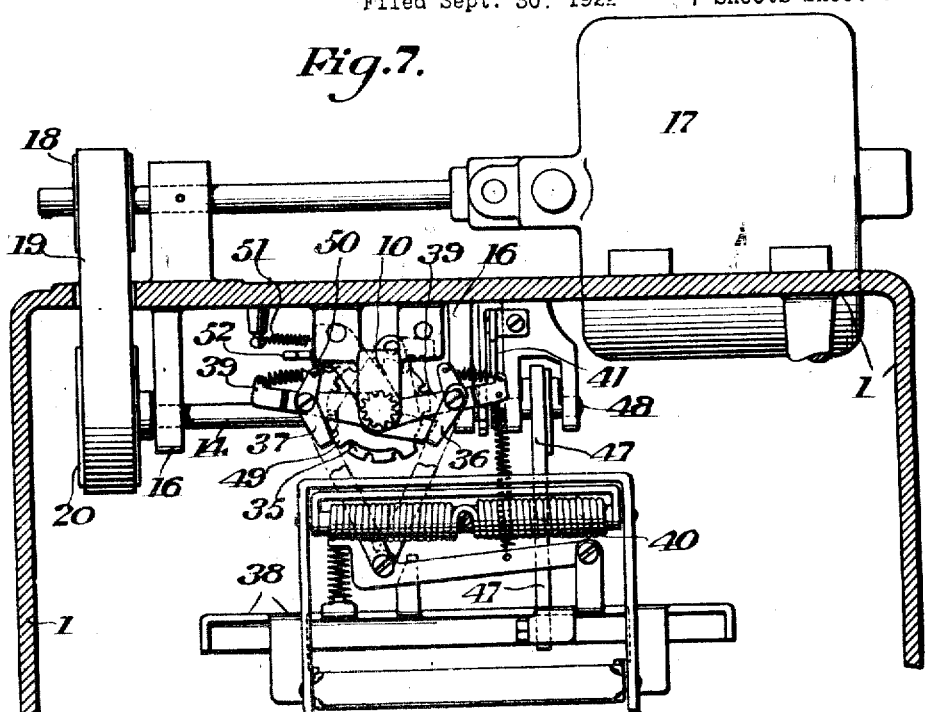
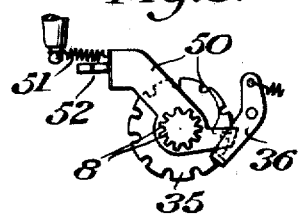
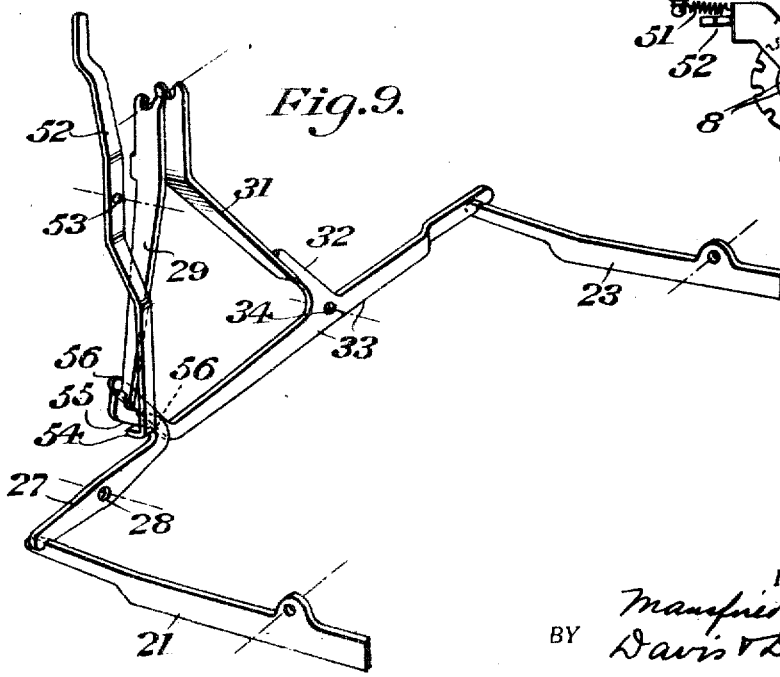
INVENTOR
Mansfield C. Crawley
BY Davis & Davis
ATTORNEYS

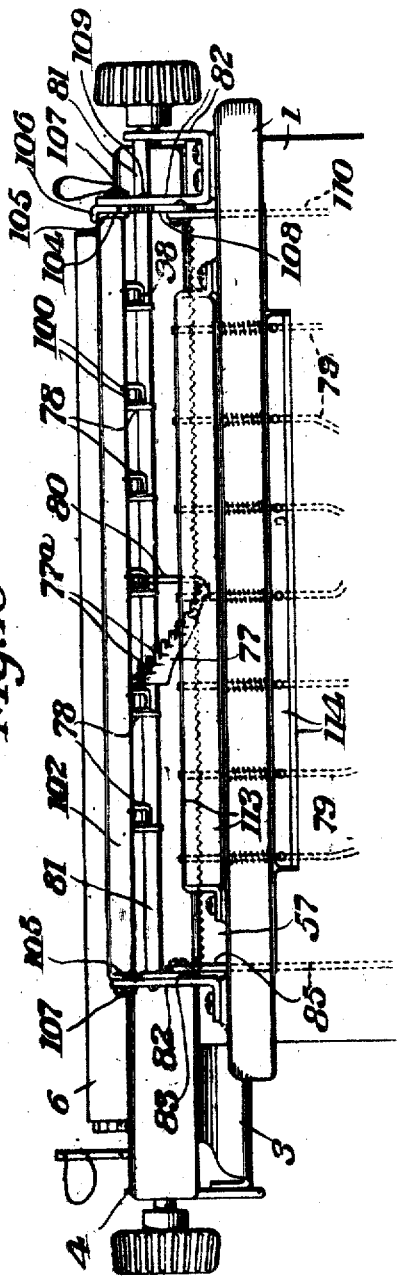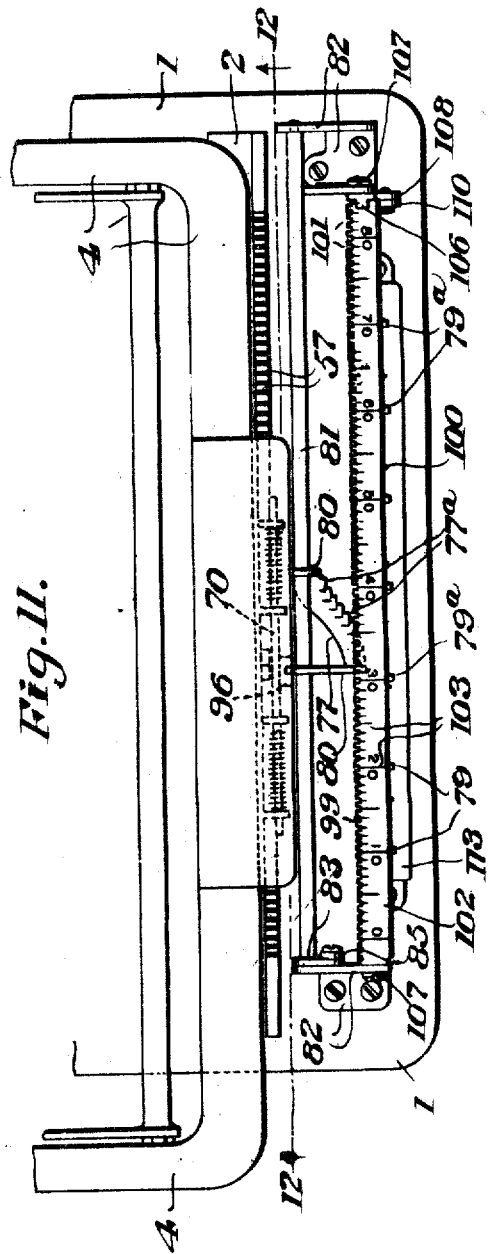

Feb. 19, 1924.
M. C. CRAWLEY
TYPEWRITING MACHINE
Filed Sept. 30, 1922
1,484,113
7 Sheets-Sheet 7
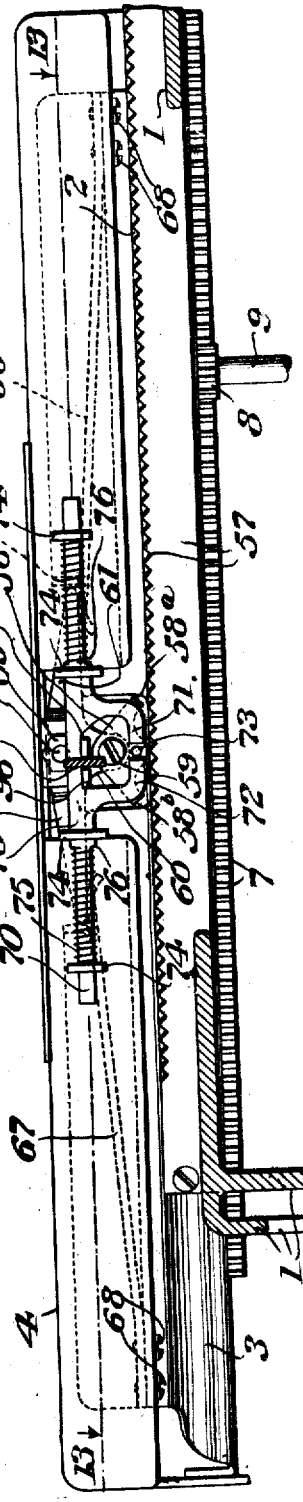
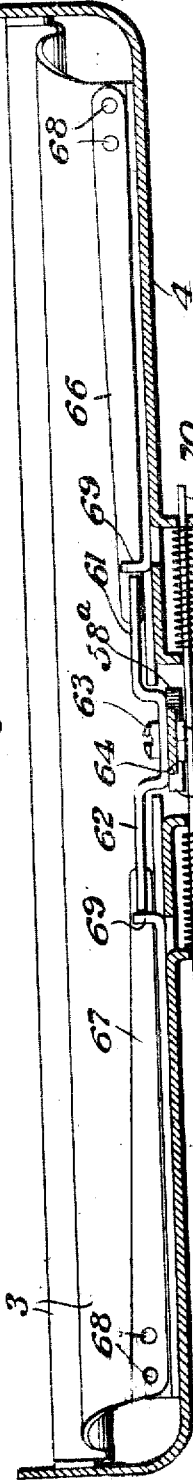
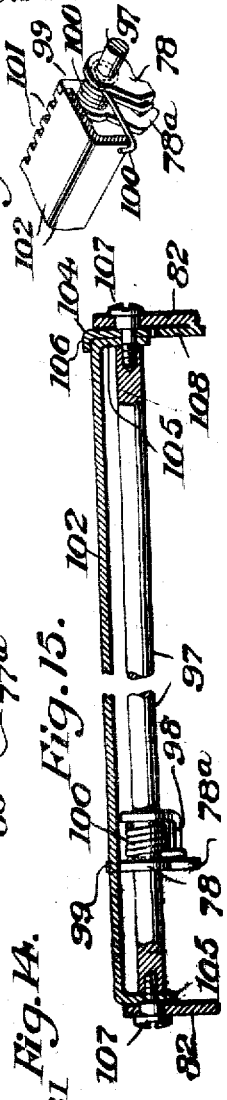
INVENTOR
Manfred C. Crawley
By Davis & Davis
ATTORNEYS Patented Feb. 19, 1924.

1,484,113

UNITED STATES PATENT OFFICE.

MANSFIELD C. CRAWLEY, OF GROTON, NEW YORK, ASSIGNOR TO ADDOGRAPH COMPANY, OF LOS ANGELES, CALIFORNIA, A CORPORATION OF CALIFORNIA.

TYPEWRITING MACHINE.

Application filed September 30, 1922. Serial No. 591,582.

*To all whom it may concern:*

Be it known that I, MANSFIELD C. CRAWLEY, a citizen of the United States of America, and a resident of Groton, in the county of Tompkins and State of New York, have invented certain new and useful Improvements in Typewriting Machines, of which the following is a specification.

This invention relates to improvements in typewriting machines, and more particularly to tabulating mechanism for such machines or other printing machines provided with traveling platen or paper carriages.

The invention has for one of its objects to provide tabulating means of increased flexibility, that is, suitable for a wide range of use to meet varying requirements.

A further object of the invention is to provide means whereby a paper carriage may be moved successively to predetermined column points or zones (progressive tabulation), moved selectively to either one of a plurality of column points or zones (column selection tabulation), or moved to a selected denominational point within a column zone (denominational or decimal tabulation) in connection with either progressive tabulating movements or column selecting tabulating movements of the carriage.

Another important object of the invention is to provide tabulating mechanism whereby the carriage may be moved in either letter feed or return direction successively to column points or zones, selectively to any one of a plurality of column points or zones, or to selected denominational points within column zones (normal and reverse tabulation).

Another important feature of the invention consists in the provision of means whereby the operator may, with a minimum of mental and physical effort, selectively jump the carriage from any point in its travel to any desired scale-point through the medium of the column selecting keys and denominational-point selecting keys (selective scale-point tabulation).

Other important objects of the invention are to provide a tabulating mechanism in which noise and shock in arresting the jump or running movement of the carriage are reduced to a minimum; to provide a tabulating mechanism in which the variably settable progressive tabulating abutment devices or column stops, the uniformly-spaced fixed-point abutment devices or column-selecting stops, and the denominational-point selecting abutments or decimal stops are relieved of shock in stopping the carriage and may accordingly be made of small and light construction; and to provide a tabulating mechanism of simple and compact construction.

In the accompanying drawings, illustrating the preferred embodiment of the invention, the tabulating mechanism is shown in connection with a power-operated typewriting machine such as disclosed in my co-pending application Serial No. 588,045, filed September 13, 1922, but it will be obvious that many features of the invention may be used in connection with other forms of power-operated writing machines and also in connection with writing machines in which the paper carriage is driven in letter-feed direction by a spring and returned by hand.

In the drawings annexed:

Figure 1 is a vertical sectional view on the line 1—1 of Fig. 3;

Fig. 2 is a detail view showing a column-selecting stop or abutment device in action in conjunction with the denominational selector;

Fig. 3 a plan view, the paper carriage and progressive tabulating column stop support being omitted;

Fig. 4 a detail perspective view showing a progressive tabulating column stop in action;

Fig. 5 a detail perspective view showing a column-selecting stop in action;

Fig. 6 a transverse section on the line 6—6 of Fig. 1, the carriage being omitted;

Fig. 7 a plan view of the letter-feed means for the carriage and the means for releasing the carriage for running movements, the releasing means being shown in action.

Fig. 8 a detail plan view of the carriage-releasing means, the releasing means and holding pawl being in normal position.

Fig. 9 a perspective view of the key-operated means for controlling running movements of the carriage;

Fig. 10 a rear elevation of the tabulating mechanism;

Fig. 11 a plan view of the parts shown in Fig. 10;

Fig. 12 a sectional view on the line 12—12 of Fig. 11;

Fig. 13 a sectional view on the line 13—13 of Fig. 12;

Fig. 14 a detail view showing yielding of an inactive progressive tabulating column stop without breaking the interlocking connection with the notched stop bar when such a stop strikes the rear edge of a decimal stop during forward rocking of the column stops; and Figs. 15 and 16 are detail views showing the construction and mounting of the progressive tabulating column stops and their supporting means.

The main frame 1 of the machine is provided with transverse raceway rails 2 cooperating with raceway rails 3 on the platen carriage 4 to form races for ball bearings 5, whereby the platen carriage is supported and guided to move transversely of the main frame. The usual platen 6 is mounted on the carriage. A transversely extending rack 7 is rigidly held to the carriage and meshes with a pinion 8 fixed on an upright shaft 9 journalled in a bearing 10 on the main frame 1. The carriage is adapted to be given a step-by-step or letter-feed movement toward the left, or to be given a running movement either toward the left or right, through the medium of rack 7, pinion 8, and shaft 9.

The means for imparting running movements to the carriage in both directions transversely of the main frame 1 of the machine, comprises a beveled pinion 11 fixed on the lower end of shaft 9 and constantly meshing with a pair of bevel gears 12 rigidly held to two oppositely facing conoidal driven clutch members 13 slidably and rotatably mounted on a continuously running drive shaft 14. The driven clutch members 13 are normally out of driving relation with a pair of companion conoidal driving clutch members 15 rigidly fixed on shaft 14. Shaft 14 is journalled in bearings 16 on the main frame and is constantly driven, while the machine is in use, by an electric motor 17 the shaft of which has a pulley 18 fixed thereon connected by a driving belt 19 with a pulley 20 fixed on shaft 14. The pinions 12 and clutch members 13 are adapted to be pressed outwardly sufficiently to establish driving connections between clutch members 13 and 15 without demeshing pinions 12 from pinion 11. When the left hand companion clutch members 13 and 15 are engaged the carriage will be driven rapidly toward the left or in letter-feed direction, and when the right hand companion clutch members 13 and 15 are engaged the carriage will be driven rapidly toward the right or in carriage-returning direction.

The left hand clutch is controlled by a carriage-advance key-lever 21 provided with a finger key 22 in the keyboard of the machine, and the right hand clutch is controlled by a carriage-return key lever 23 provided with a key 24 in the keyboard of the machine, said key levers being preferably arranged adjacent opposite sides of the machine and adjacent opposite ends of and in transverse alinement with a row or bank of column-selecting keys hereinafter described. These column-selecting keys are preferably located to the rear of the usual banks or rows of printing keys. The key levers 21 and 23 are pivoted intermediate their ends on a fulcrum rod 25 mounted in a bracket 26 extending transversely across the main frame 1 and rigidly held at its ends to said frame. Said key levers are restored by springs in a transverse row of return springs 90 and their throw is limited by stop devices 91 and 92 hereinafter described.

A depression of the advance key 22 causes the rear end of key lever 21 to lift the outer end of a transversely extending sub-lever 27, said sub-lever being pivotally supported at 28 in the main frame to rock up and down. The inner end of the sub-lever is adapted to press inwardly against the lower end of an up-standing clutch-operating lever 29 which is pivoted at 30 in the main frame to swing transversely, so that when key 22 is depressed the forked upper end of clutch-operating lever 29 will press the left hand pinion 12 and the attached clutch member 13 slightly outward or toward the left to establish a driving connection between the companion left hand clutch members 13 and 15. The right hand pinion 12 and the attached right hand clutch member 13 are adapted to be pressed outwardly or toward the right, to establish a driving connection between the companion right hand clutch members 13 and 15, by the forked upper end of an upstanding transversely swinging clutch-operating lever 31, which lever is also pivoted at 30. The lower end of lever 31 is adapted to be pressed inwardly, upon depression of the carriage-return key 24, by an arm 32 on a transversely extending sub-lever 33 pivoted intermediate its ends in the main frame at 34 to rock up and down, the rear end of key lever 23 engaging under the outer end of the sub-lever to rock said sub-lever.

The letter-feed mechanism hereinbefore referred to is fully shown and described in my co-pending application Serial No.

588,046, filed September 13, 1922, and only so much thereof as is necessary to an understanding of the tabulating movements of the carriage is illustrated and described herein. It consists generally of a feed wheel 35 fixed on the shaft 9 and adapted to be stepped around by means of a pair of pawls 36—37 to advance the carriage in letter-feed direction through the medium of pinion 8 and rack 7. The pawls are reciprocated by the fore-and-aft reciprocable type-bar actuator 38, the pawl-carrying arms 39 being swung forwardly and backwardly about shaft 9 by the actuator. The actuator is normally locked in rear position against the tension of spring 40 by a hook 41 and is released by operation of the printing key levers 42 which lift type-bar selectors 43 to place couplers 44 connected to type-bars 45 in the path of the actuator, said couplers actuating a universal trip bar 46 to release the actuator. At the end of its forward movement the actuator is pulled back and re-locked through the medium of a pitman 47 and a crank shaft 48 which is temporarily connected with shaft 14 for this purpose, all as more fully shown and described in my co-pending application Serial No. 577362, filed July 25, 1922. The pawl 36 normally engages in one of the notches of the feed-wheel 35 and pawl 37 is normally held out of engagement with the feed wheel, as shown in Figs. 6 and 8, so that pawl 36 normally locks the carriage against movement in either direction. Pawl 36 feeds the carriage one-half letter-space on the forward stroke of the actuator and pawl 37 feeds the carriage another half space on the return stroke of the actuator, the pawls being controlled by a cam plate 49, as set forth in said application Serial No. 588,046.

It will be obvious that, whenever it is desired to give the carriage a running or jump movement in tabulating, it is necessary that pawl 36 be disengaged from feed-wheel 35 to permit driving of shaft 9 from shaft 14 through one or the other of the clutch connections above described. For this purpose a carriage-release lever 50 is pivoted on shaft 9 and is normally held in the position shown in Fig. 8 by a spring 51 with one end in engagement with pawl 36 and the other end in engagement with the upper end of a vertical lever 52. Lever 52 is pivoted at 53 on the main frame to swing transversely, and is provided at its lower end with a rearwardly extending lug 54 with which cam edges 55 and 56 on sub-levers 27 and 33, respectively, engage to rock said lever 52 in a direction to swing release lever 50 to cause the release lever to cam pawl 36 out of the notch in the feed wheel (as shown in Fig. 7) when either of the key levers 21 and 23 is operated.

A universal carriage-stopping means is provided for arresting the carriage at the end of all tabulating movements of the several types above described, said means comprising a tabulator rack 57 and a double-dog carriage-stop 58 having two oppositely extending dogs or projections 58ª and 58ᵇ adapted to engage the teeth of the rack to stop advance and return movements, respectively, of the carriage. The teeth of rack 57 are spaced to correspond with the letter-space feed steps of the paper carriage 4, and said rack extends transversely of the main frame and is rigidly secured to the rear face of the rear raceway rail 2. Stop 58 is pivotally mounted midway its ends on a fore-and-aft extending stud or pivot screw 59 located midway the ends of the carriage and rigidly held to the central depending arm 60 of a three-arm rocker plate or lever having a pair of arms 61—62 extending toward opposite sides of the machine. The three-arm lever is pivotally held midway its ends on a bolt 63 located above screw 59 and held to a depending lug 64 on the carriage midway the ends of the carriage by a nut 65. This three-arm rocker member is normally yieldably held in the position shown in Fig. 12 by two flat springs 66 and 67 the free inner ends of which press upwardly against the outer ends of arms 61 and 62, respectively, of said member. Springs 66 and 67 are secured to the carriage at their outer ends by screws 68 and upward movement of the free ends of the springs is limited by lugs 69 on the carriage.

The dogs 58ª and 58ᵇ are adapted to be rocked into engagement with rack 57 by movement of the carriage in opposite directions relatively to a yieldably held trip bar 70 having stop-actuating arms or lugs 71 and 72 located at opposite sides of a rearwardly extending pin 73 rigidly held to stop 58 below the stop pivot screw 59. The trip bar 70 extends transversely of the machine and is slidably held to the carriage 4 at the rear thereof in apertures in four lugs 74 extending rearwardly from the carriage. A pair of compression springs 75 coiled around bar 70, and engaging the two outer lugs 74 and shoulders 76 on said bar, normally hold the trip bar to travel with the carriage midway the ends of the carriage.

The operation of the universal carriage stop 58 and its trip bar 70 is controlled by engagement of either of the denominational-point determining abutments or decimal stops 77ª formed on a denominational selector 77 with abutments 78ª or 79ª formed respectively on two series of column stops or zone-determining devices 78 and 79 mounted on the frame 1 of the machine. The denominational selector 77 is stamped from a single piece of thin sheet metal and comprises a main bar-like body portion twisted into general spiral form and provided at its ends with integral supporting arms 80 provided with square apertures for slidably holding the selector to a transverse rock shaft 81 of square cross-section so that the selector may slide on the shaft and rock therewith. The spirally bent body portion of the selector is formed along one edge with ten integral decimal stops or denominational-point-determining abutment lugs 77ª stepped spirally with relation to the axis of rock shaft 81 and spaced longitudinally of the axis of the shaft, that is, transversely of the machine, for single letter-space movements of the carriage, the opposite side edges of either decimal stop being adapted to engage opposite side edges of parts 78ª and 79ª of stops or abutment devices 78 and 79.

The ends of shaft 81 are rotatably supported in bearings in a pair of brackets 82 rigidly held to the main frame 1 adjacent opposite sides of the machine to support said shaft at the rear of the carriage 4 parallel with the path of movement of the carriage. A rock arm 83 rigidly affixed to one end of shaft 81 normally extends downwardly and rearwardly in the position shown in Fig. 1 to normally maintain the decimal stop 77ª at the right hand end of the selector in a horizontal plane into which abutments 78ª and 79ª of column stop devices 78 and 79 are shiftable by means hereinafter described. Rock arm 83 is connected by a link 85 with the rear end of one of the side arms 86 of a bail the transverse bar 87 of which is formed with an inclined portion 87ª the lower edge of which inclines downwardly from right to left.

The right hand stop 77ª is the decimal-point determining stop or abutment, the next stop 77ª is the units denominational-column determining stop, and the successive remaining stops 77ª determine the decimal-notation or denominational columns "tens," "hundreds," "thousands," "ten-thousands," "hundred-thousands," "millions," "ten-millions," and "hundred-millions," respectively. Nine denominational-point selecting key levers 88 are provided for selectively shifting either of the nine stops 77ª located to the left of the decimal-point stop upwardly into the horizontal plane in which the decimal-point stop is normally held. Key-levers 88 are of uniform shape, are pivoted on a fulcrum rod 89 supported in the main frame, are returned by compression springs 90, and are guided in a combined return stop-bar and guide-comb 91 and adapted when depressed to engage a stop-rod 84, said comb and rod limiting the throw of the key levers in opposite directions. The inclined part 87ª of the bail overlies all the key levers 88, is normally held down on the rear end of the left hand or "hundred millions" key lever by a coil spring 93 to present the decimal-point stop 77ª in active position, and is spaced progressively farther above the rear ends of the remaining key levers 88 in order from left to right. The side arms of the bail 87 are pivoted at 94 on ears on bracket 26 and it will be obvious that key levers 88 in order from right to left will rock the bail and the selector 77 upward progressively greater distances upon depression of keys 95 thereon which are provided with the designations "units," "tens," etc., corresponding with the denominational values of the key levers and preferably printed in black for the purpose hereinafter described. Any abutment 77ª may thus be shifted to cause it to travel in the path normally traversed by the right hand or decimal-point abutment.

The denominational selector is connected with the carriage 4 to normally travel in unison therewith by reason of the engagement of the forward end of the right hand arm 80 of the selector between two rearwardly extending lugs 96 on the trip bar 70. It will be obvious that if the movement of the selector is arrested, by engagement of one side edge or the other of any stop 77ª with one or the other of the side faces of either of the abutments 78ª and 79ª, the trip bar will also be arrested, while the carriage may continue to move for a short distance, thereby compressing one or the other of springs 75 and rocking either the dog 55ª or the dog 58ᵇ into engagement with rack 57 and stopping the carriage. The relative movement between the carriage and selector is sufficient to compensate for the thickness of the two engaged abutments 77ª—78ª or 77ª—79ª, whereby the carriage may be stopped at the desired point whether moving toward the left or toward the right. Springs 75 cushion impacts of stops 77ª against abutments 78ª and 79ª, eliminating noise and jar and preventing damage to the lightly constructed sheet metal stops. Spring 67 absorbs the shock of impact of dog 58ª against a tooth of rack 57 while spring 66 absorbs the shock of impact of dog 58ᵇ against a rack tooth, thus reducing jar and noise and wear. The stop 58 and rack 57 do the actual work of arresting the carriage and are made relatively heavy and strong. It will be observed that shocks due to stopping tabulating movements of the carriage are not transmitted to the selector 77 and stops 78 and 79 or any of the tabulating keys of the machine.

The progressive tabulating column stops 78 are mounted on the machine frame for variable adjustment transversely of the machine and are rockable in unison from an inactive position to a position in cooperative relation with the denominational selector, that is to place abutments 78ᵃ in the path normally traversed by the decimal-point stop 77ᵃ at the right hand end of the selector. Each stop 78 is formed of a single piece of thin sheet metal and comprises a pair of parallel supporting arms provided with round bearing apertures for supporting the stops to slide and rock on a rod 97 of circular cross-section, said arms being connected below the rod by an integral cross-bar 98 and one of the arms being formed at its lower end with a forwardly and downwardly extending stop finger or abutment 78ᵃ and at its upper end with a locking finger or lug 99 yieldably held by a spring 100 in one of a series of notches 101 formed in the forward edge of the horizontal web of an angular stop-bar 102 formed of light sheet metal with a depending web at its rear edge. Springs 100 are coiled around rod 97 between the arms of the respective stops with one end of each spring bent upwardly at the rear of the depending web of bar 102 and the other end thereof engaging the rear edge of cross-bar 98 of the stop. Notches 101 are spaced to correspond with letter-space feed movements of the carriage and the horizontal flange of bar 102 is provided with graduations 103 corresponding with the letter-space positions of the carriage.

The carriage of the machine shown has a travel of eighty letter-spaces and it will be noted from Fig. 11 that bar 102 has notches 101 at both ends in addition to the eighty notches between the points "0" and "80" on scale 103, whereby one or more of the stops 78 may be shifted beyond the field of travel of the carriage and locked to the bar 102 in inactive or "stored" position. As many of the stops 78 may be mounted on rod 97 as desired. The stops are adjusted transversely of the machine by rocking the same about rod 97 until finger 99 is released, then shifting the stop laterally along the rod until finger 99 is opposite the desired notch and releasing the stop. It will be observed from Fig. 14 that if an inactive stop 78 should strike against the rear edge of one of the decimal stops when the stops 78 are rocked forwardly, as hereinafter described, said inactive stop may yield without becoming unlocked from the notch 101 in which its finger 99 is engaged.

A toothed segment 104 abuts against the outer face of the left hand one of a pair of depending ears 105 on the ends of bar 102. Shouldered pivot screws 107, rotatably mounted in brackets 82 and screwed into sockets in the ends of rod 97, tightly bind rod 97, bar 102, and segment 104 together so that they rock as a unit, lugs 105 being pressed tightly against the ends of the rod by the shoulders on the screws. The upper end of segment 104 is bent flat down upon the horizontal flange of bar 102 at 106 to aid in preventing relative rotary movement between said segment and bar. The teeth of segment 104 mesh with the teeth of a sector segment 104 pivoted on the left hand bracket 82 at 108, and connected by a link 110 with the rear end of a progressive tabulator stop-bar-operating key lever 111 which is pivoted intermediate its ends on fulcrum rod 25 and is provided with a key 112 at its forward end. The throw of the key-lever 111 is also regulated by stops 91 and 92, before described, to determine the normal and active positions of stops 78, and said lever is returned by a spring 90.

In the machine illustrated there are seven of the column selecting stops or selective major columnar point or zone determining devices 79 spaced ten letter spaces apart transversely of the machine and located to arrest the carriage at the points 10, 20, 30, 40, 50, 60 and 70 of the scale 103. Each stop device 79 comprises an upstanding one-piece bar-like member formed of thin sheet metal and guided in fore and aft extending slots in transverse guide bars 113 and 114 on the frame 1 to move vertically and also edgewise fore and aft of the machine. The lower ends of stop devices 79 are twisted into a transverse plane and are guided in transverse slots in a guide bar 115 on the frame, said lower ends of the stop devices being notched to receive the upper edges of the rear ends of column selecting key levers 116, of which there are seven, pivoted intermediate their ends on fulcrum rod 25 and provided with keys 117 in the same bank with keys 112, 22 and 24. The keys 117 are provided with designations 10, 20, 30, 40, 50, 60, and 70 in order from right to left to correspond with the location of the stops 79 operated thereby, said designations being preferably printed in black to correspond with the color in which the decimal notation values of keys 95 are printed.

The throw of key levers 116 is limited by the stops 91 and 92, and said levers have restoring springs in the transverse row of springs 90. Key levers 116, and the key levers 21, 23 and 111, are provided with shoulders 91ᵃ adapted to engage comb 91 to limit the upward movement of the keys thereon and are provided with lugs 92ᵃ adapted to engage the top of comb 92 to limit the downward movement of the keys. Key levers 88 are provided with shoulders 88ᵃ adapted to engage comb 91 to limit the upward movement of the keys 95 and are adapted to engage under rod 84 to limit the downward movement of said keys.

Stops 79 are normally yieldably held in inactive position by springs 118 and are provided with rearwardly projecting cam lugs 119 the downwardly and rearwardly extending upper edges of which ride across the rear edges of the slots in guide bar 113 to rock the stops forwardly when the stops are elevated by the key levers 116. The upward and forward movement imparted to a stop 79 upon depression of its operating key 117 shifts the abutment or stop finger 79ª on the upper end of the stop into the path normally traversed by the right hand or decimal point stop finger 77ª on the denominational selector 77. Stops 79 are arrested in set position by engagement of a shoulder 120 with bar 113, the forward and rearward rocking of the stops being controlled further by engagement of the edges of the stops with the ends of the slots in guides 113—114.

*Progressive column or zone tabulation.*

It will be obvious from the foregoing description that the carriage may be given successive movements to the points for which the unstored stops 78 are set by first depressing key 112 and then depressing either key 22 or key 24. If key 22 is depressed the carriage will move toward the left until the left-hand edge of decimal-point stop 77ª engages the right hand face of the next abutment 78ª to the left and trips the universal stop. This operation may be repeated for as many more of the stops 78 as desired. If key 24 is depressed the carriage will move to the right until the right hand edge of decimal-point stop 77ª engages the left hand face of the next abutment 78ª to the right thereof and trips the universal carriage stop 58.

*Selective column or zone tabulation.*

The carriage may be moved directly to any desired one of the uniformly spaced column points determined by the location of stops 79 by depressing the key 117 containing the black letter designation corresponding with the scale position of the stop selected and then depressing key 22, if the selected stop is to the left of the printing point at which the carriage is standing, or key 24 if the selected stop is to the right of such point.

*Decimal or denominational tabulation.*

Instead of arresting the carriage at the scale point determined by a stop 78 in progressive tabulation, the carriage may be arrested at either of nine successive letter spaces to the right (or in advance) of such scale point for writing numbers in the column field of the stop having from one to nine digits, or for other purposes. This operation is brought about by depressing key 112 and the key 95 having the desired black letter decimal order designation and then depressing either key 22 or key 24 dependent upon the desired direction of movement of the carriage.

This denominational-point or decimal order selection may be obtained in selective column tabulation by depressing the column-selecting key 117 containing the black letter designation corresponding with the scale point desired for the decimal-point to print, depressing the key 95 having the desired black letter decimal order designation, and then depressing either key 22 or key 24 dependent upon the desired direction of movement of the carriage.

*Selective scale-point tabulation.*

The operator frequently desires to move the carriage directly to some particular scale-point or letter-space position intermediate those determined by stops 79. In order that this may be accomplished with a minimum of mental and physical effort provision is made for utilizing the keys 95 and 117 and the stops settable thereby for this purpose. To this end keys 117 are provided successively from right to left with designations "0", "10", "20", "30", "40", "50", and "60", respectively, said designations being preferably printed in red or other color contrasting with the designations on the keys which denote the scale-point location of the stops operated thereby. It will be noted that each red letter designation is less by ten than the black letter designation on the same key. Red letter numerals, 1, 2, 3, 4, 5, 6, 7, 8 and 9 are printed on the keys 95 in order from left to right. It will be obvious that by depressing the key 117 numbered "0" in red and the key marked "1" in red the carriage will be arrested at point "1" on the scale 103 or one letter-space from its extreme return position. By depressing key 117 marked "0" and the properly red-numbered key 95 the carriage may be arrested at any point from "1" to "9" on the scale. Depression of key 117 numbered "10" in red and key 95 numbered "1" in red will cause stoppage of the carriage at scale-point "11". Depression of this last-mentioned key 117 and key 95 numbered "2" in red will cause stoppage of the carriage at scale point "12", and so on. It will of course be understood that in connection with the operation of the key-combinations described under this heading, either key 22 or key 24 is also operated to run the carriage directly to the scale-point selected.

*Reverse tabulation.*

It will be noted from the description of the operation of the machine above, that in either type of tabulating the carriage may be given tabulating movements from left to right, that is in a direction opposite to its letter-feed travel, as well as movements from right to left.

What I claim is:

1. In a writing machine, the combination of a machine frame, a paper carriage mounted thereon to travel transversely of the frame, power means for giving the carriage a running movement in either direction of its travel, a denominational selector mounted to travel with the carriage having decimal-order abutments, and a series of stops on the frame spaced transversely of the frame and the opposite side faces of which are adapted to be engaged by opposite sides of the decimal-order abutments to effect stoppage of the carriage.

2. In a writing machine, the combination of a machine frame, a paper carriage mounted thereon to travel transversely of the frame, power means for giving the carriage a running movement in either direction of its travel, a denominational-point selector mounted to travel with the carriage, a series of transversely spaced stops on the frame, and means for rocking the selector about an axis extending transversely of the frame, said selector embodying a series of decimal-order stops arranged spirally with respect to the axis of rockability of the selector and each having two abutment faces respectively facing toward opposite sides of the machine and adapted to engage opposite sides of the transversely spaced stops.

3. In a writing machine, the combination of a machine frame, a paper carriage mounted thereon to travel transversely of the frame, power means for giving the carriage a running movement in either direction of its travel, a denominational-point selector mounted to travel with the carriage, a series of transversely spaced stops on the frame, and means for rocking the selector about an axis extending transversely of the frame, said selector embodying a series of ten decimal stops arranged spirally with respect to the axis of rockability of the selector and each having two abutment faces respectively facing toward opposite sides of the machine and adapted to engage opposite sides of the transversely spaced stops, the decimal stop at one end of the series being normally in active position, and a series of nine decimal-order selecting keys on the frame operatively connected to shift the selector-rocking means different distances.

4. In a writing machine, a main frame, a universal carriage-stopping means, a paper carriage mounted to travel transversely of the frame, means for moving the carriage, a group of decimal stops mounted to normally travel as a unit with the carriage, transversely spaced zone stops on the frame adapted to engage a set decimal stop and arrest all of said decimal stops, means permitting a short continued travel of the carriage after the decimal stops are arrested, and means whereby such continued movement of the carriage actuates the universal carriage-stopping means.

5. In a writing machine, the combination of a frame, a paper carriage mounted thereon to travel transversely thereof, an abutment device mounted to normally travel with the carriage, transversely spaced abutment devices on the frame, means whereby the carriage may continue to travel after the device traveling therewith is arrested by one of the devices on the frame, a universal carriage-stopping means, means whereby said continued travel of the carriage actuates the carriage-stopping means, and means for cushioning the action of the carriage-stopping means.

6. In a writing machine, the combination with a frame, a paper carriage mounted to travel transversely of the frame, and means for giving the carriage running movements, of a denominational-point selecting means mounted to normally travel with the carriage, stops on the frame adapted to arrest said selecting means, a yielding connection between said selecting means and the carriage permitting the carriage to continue to travel after the selecting means is arrested, a pivotally held stop on the carriage, a rack on the frame, and means whereby said continued travel of the carriage will rock said pivoted stop into engagement with the rack to arrest the carriage.

7. In a writing machine, a frame, a traveling carriage on the frame, a stop mounted to normally travel with the carriage, a stop on the frame for arresting the first-mentioned stop, means whereby the carriage may continue to travel after the first-mentioned stop is arrested, a stopping dog, means whereby said continued travel of the carriage rocks said dog, a rockable member pivotally mounted on the carriage to which said dog is pivotally held, a spring on the carriage for resisting the rocking of said member when the dog is put into action, and a rack on the frame engaged by said dog upon rocking of the dog on its pivot to arrest the carriage.

8. In a writing machine, a main frame, a paper carriage mounted thereon to travel transversely of the frame, power means for giving the cariage running movements in either direction of its travel, double-faced decimal stops mounted to travel with the carriage, a series of transversely spaced zone stops on the frame, and means put into action by engagement of a decimal stop with a zone stop for arresting the carriage at the selected denominational point in the zone of the latter stop when the carriage is traveling in either direction.

9. In a writing machine, a main frame, a paper carriage mounted thereon to travel transversely of the frame, power means for giving the carriage running movements in either direction of its travel, a series of transversely spaced zone stops on the frame, denominational-point selecting means mounted to travel with the carriage and adapted to cooperate with each zone stop and embodying a spiral series of stepped double-faced decimal stops, means for rotating said spiral series of stops to bring any one thereof into cooperative relation with a zone stop, and a carriage-arresting stop actuated by engagement of either face of any decimal stop with a zone stop.

10. In a writing machine, a main frame, a paper carriage mounted thereon to travel transversely of the frame, power means for giving the carriage running movements in either direction of its travel, a series of transversely spaced zone stops on the frame, a double-faced cooperating stop traveling with the carriage, and means actuated by said double-faced stop for arresting the carriage by cooperation with the frame of the machine, said means embodying an oppositely working resilient buffer means for eliminating noise and jar in arresting the carriage in either direction of its travel.

11. In a typewriting machine, a rockable carriage-stop on the carriage having two opposite stop-dogs, a rack on the frame, means for giving the carriage a running movement in either direction, a series of stops, and means actuatable by any one of said stops for rocking the carriage-stop in either direction to stop the carriage by engagement with said rack.

12. In a writing machine, a frame, a paper carriage mounted on the frame to travel transversely thereof, means for running the carriage in opposite directions, a denominational selector normally traveling with the carriage having a spirally stepped series of decimal stops, means for rockably adjusting said selector to bring any one of the decimal stops into action, zone stops on the frame for arresting the selector, means yieldably connecting the selector to the carriage to permit the carriage to continue to travel after the selector is arrested, a double-dog carriage-stop, a rockable plate on the carriage to which said double-dog stop is pivotally held, springs on the carriage resisting rocking of the plate in opposite directions, means operable by movement of the carriage after stoppage of the selector for rocking the double-dog stop in different directions in accordance with the direction of travel of the carriage, and a rack on the frame for cooperation with either dog on the carriage stop.

13. Tabulating mechanism for writing machines comprising a traveling carriage, means for moving the carriage at will through a plurality of letter-spaces, a tabulator stop support extending parallel with the path of travel of the carriage and shiftably mounted independently of the carriage, a series of stops on said support adjustable longitudinally of the support, a second series of stops arranged ten letter-spaces apart longitudinally of the path of travel of the carriage and mounted independently of the carriage, means movable with the carriage operable by stops of either series to arrest the carriage, means for shifting the stop support to simultaneously position the stops thereon in the path of movement of the carriage-arresting means, and means for moving any desired one of said second series of stops into the path of the carriage-arresting means.

14. In a typewriting machine, the combination of a traveling paper carriage and tabulating mechanism associated with the carriage, said mechanism comprising a key-set denominational-point selector mounted to travel with the carriage, a shiftable carriage-arresting stop mounted on the carriage, a series of relatively adjustable tabulator stops mounted independently of the carriage, means for shifting said tabulator stops simultaneously into and out of the path of said selector, a rack supported independently of the carriage, and means connecting said carriage-arresting stop and selector for moving the stop into engagement with the rack when the selector strikes a tabulator stop.

15. In a typewriting machine, the combination of a traveling paper carriage and tabulating mechanism associated with the carriage, said mechanism comprising a key-set denominational point selector mounted to travel with the carriage, a shiftable carriage-arresting stop mounted on the carriage, a series of column-selecting stops spaced ten letter spaces apart, key-operated means for setting any desired one of said stops in the path of said denominational-point selector, and connections between the selector and the carriage-arresting stop for actuating said carriage-arresting stop when the selector engages a set stop.

16. In a typewriting machine, the combination of a frame, a carriage movable transversely of the frame, a stationary rack supported on the frame, a carriage-arresting stop mounted on the carriage and adapted to engage said rack, key-controlled column-selecting stops, a tabulator-stop support, variably adjustable column stops carried by said support, key-controlled means for shifting said support to simultaneously shift the column stops to active position, and means operable either by a set column-selecting stop or an active column stop to actuate the carriage-arresting stop.

17. In a tabulating mechanism, the combination with a traveling carriage and denominational keys, of means mounted to travel with the carriage and settable by said keys in different positions relatively to the carriage corresponding with the value of the key operated, column-selecting keys, and devices settable by said column-selecting keys in position to engage with said denominational-key-set means to effect stoppage of the carriage.

18. In a tabulating mechanism, the combination with a traveling paper carriage and denominational keys, of means mounted to travel with the carriage and settable by said keys in different positions relatively to the carriage corresponding with the value of the key operated, column-selecting keys, devices settable by said column-selecting keys in position to engage with said denominational-key-set means, and means for arresting the carriage operated by engagement of said denominational-key-set means with either of said devices.

19. In a tabulating mechanism, the combination with a traveling paper carriage and denominational keys, of means mounted to travel with the carriage and settable by said keys in different positions relatively to the carriage corresponding with the value of the key operated, column-selecting keys, devices settable by said column-selecting keys in position to engage with said denominational-key-set means, means for arresting the carriage operated by engagement of said denominational-key-set means with either of said devices, and means forming a yielding connection between said denominational-key-set means and said carriage.

20. In a tabulating mechanism, the combination with a traveling carriage, of a columnar-point determining device, a decimal-order determining device, one only of said devices traveling with the carriage, means whereby the carriage may continue to travel relatively to said devices after engagement of the devices with each other, and a carriage stop operable by such continued movement of the carriage to arrest the carriage at the point for which said devices are set.

21. In a typewriting machine, a rockable carriage-stop on the carriage having two opposite stop-dogs, a rack on the frame, means for giving the carriage a running movement in either direction, a series of stops, and means actuatable by any one of said stops for rocking the carriage-stop in either direction to stop the carriage by engagement with said rack, said means embodying a slidable plate on the carriage resiliently held so as to be adapted to shift toward either end of the carriage.

22. In a typewriting machine, a double-dog rockable stop on the carriage and means for rocking the same in either direction, and a stop-rack on the frame extending the length of travel of the carriage and adapted to be engaged by either one of the two dogs of the rockable stop.

23. In a tabulating mechanism, the combination with a machine frame and a traveling paper carriage mounted thereon, of a decimal-order determining device traveling normally with the carriage, decimal-order keys mounted in the frame independently of the carriage, operating means between said keys and device for selectively positioning said device relatively to the carriage in accordance with the value of the key operated, means whereby said device and carriage may have a relative movement independently of the movement of the device by the keys, columnar-point determining devices mounted independently of the carriage adapted to be engaged by said decimal-order determining device to arrest the latter device, and a carriage stop operable by continued movement of the carriage after arresting of the decimal-order determining device.

24. In a typewriting machine, the combination with a traveling paper carriage, a denominational-point selecting device movable with the carriage, a set of columnar-point determining devices variably adjustable longitudinally of the path of movement of the carriage, a second set of selectively movable columnar-point determining devices, column-selecting keys for moving either one of said second set of devices into the path of said denominational-point-selecting device to effect stoppage of the carriage, a progressive column tabulating key for shifting said first set of devices into and out of the path of said denominational-point selecting device to effect successive stoppages of the carriage and denominational keys for variably adjusting the denominational-point selecting device relatively to the carriage.

25. In a typewriting machine, the combination with a traveling paper carriage, a denominational-point selecting device movable with the carriage, a set of columnar-point determining devices variably adjustable longitudinally of the path of movement of the carriage, a second set of selectively movable columnar-point determining devices, column-selecting keys for moving either one of said second set of devices into the path of said denominational-point selecting device to effect stoppage of the carriage, a progressive column tabulating key for shifting said first set of devices into and out of the path of said denominational-point selecting device to effect successive stoppages of the carriage, a set of denominational keys for variably adjusting the denominational-point selecting device relatively to the carriage, means whereby said denominational point selecting device may yield relatively to the carriage in either direction of travel of the carriage, and means operable by such relative yielding movement of said selecting device for arresting the carriage when moving in either direction of its travel.

26. In a typewriting machine, a power means therein embodying a continuously-running shaft, a carriage-operating mechanism capable of feeding the carriage and also giving the carriage a running movement in either direction, mechanism for putting said carriage-running mechanism in operation embodying a rightward-running key and a leftward-running key, and key-actuated carriage-arresting means capable of stopping the carriage in its running movement at any letter-space point in its travel in either direction.

27. In a writing machine, the combination with a traveling paper carriage and means for moving the same, of denominational-point selecting means, a set of progressive column tabulating abutment devices variably adjustable longitudinally of the path of the carriage, a set of selective independently key-actuated column tabulating abutment devices, means whereby relative movement longitudinally of the path of the carriage is imparted between the denominational-point selecting means and said sets of devices during travel of the carriage, and means whereby said denominational-point selecting means may cooperate with abutment devices of either set to effect stoppage of the carriage.

28. In a writing machine, the combination with a traveling paper carriage and means for moving the same, of denominational-point selecting means, a set of progressive-column tabulating abutment devices variably adjustable longitudinally of the path of the carriage, a set of selective independently key-actuated column tabulating abutment devices, means whereby relative movement longitudinally of the path of the carriage is imparted between the denominational-point selecting means and said sets of devices during travel of the carriage, and key-controlled means for imparting relative movement transversely of the path of travel of the carriage between said denominational-point selecting means and a device of either set to bring about engagement between the device and selecting means for effecting stoppage of the carriage.

29. In a tabulating means, a rockable column-stop support comprising a rod and a notched bar held to rock as a unit, said bar having a letter-space scale and a notch for each letter-space position and additional notches at each end of the letter-space position notches, a plurality of stops slidably and pivotally held to said rod and each having a finger adapted to engage in the notches in the bar, and a spring for each stop, each of said springs being coiled around the rod and having one end engaging the stop to hold its finger in one of the notches and its other end engaging the bar.

30. In a writing machine, the combination with a plurality of column-selecting stops spaced ten letter-spaces apart, and a series of ten decimal-order stops one of which at one end of the series is normally in active position, of a series of nine decimal-order keys for setting the remaining decimal order stops provided with decimal order designations from right to left in one color and provided with designations "1" to "9" from left to right in a contrasting color, and a series of column-selecting keys for setting the column-selecting stops in position to cooperate with an active decimal-order stop, said column-selecting keys being provided with designations "10," "20," etc. from right to left corresponding with the scale-point location thereof and in the same color as the decimal-order designations of the other series of keys and also provided with designations "0," "10," "20" etc. from right to left and in a color corresponding with the designations "1" to "9" on the other series of keys.

In testimony whereof I hereunto affix my signature.

MANSFIELD C. CRAWLEY.